United States Patent [19]
Xie

[11] Patent Number: 5,934,802
[45] Date of Patent: Aug. 10, 1999

[54] PLANETARY GEAR SYSTEM FOR MIXER

[75] Inventor: Mark M. Xie, Tipp City, Ohio

[73] Assignee: Premark FEG L.L.C., Wilmington, Del.

[21] Appl. No.: 08/929,369

[22] Filed: Sep. 15, 1997

[51] Int. Cl.[6] .................................. A21C 1/14; B29B 7/22
[52] U.S. Cl. ...................... 366/100; 366/288; 475/317; 475/346
[58] Field of Search ............................ 366/96–100, 197, 366/198, 203, 207, 287, 288; 475/149, 317, 331, 346

[56] References Cited

U.S. PATENT DOCUMENTS

| | | |
|---|---|---|
| Re. 15,746 | 1/1924 | Westerman . |
| 1,438,281 | 12/1922 | Westerman . |
| 1,475,978 | 12/1923 | Westerman . |
| 1,656,665 | 1/1928 | Dehuff ..................................... 366/197 |
| 1,781,321 | 11/1930 | Dehuff ..................................... 366/207 |
| 1,785,562 | 12/1930 | Schiff ...................................... 366/288 |
| 2,404,380 | 7/1946 | Jensen . |
| 2,457,612 | 12/1948 | Thiel . |
| 2,931,232 | 4/1960 | Martin ..................................... 366/197 |
| 3,228,753 | 1/1966 | Larsen . |
| 4,183,266 | 1/1980 | Osumi . |
| 4,784,338 | 11/1988 | Saladin . |
| 5,150,968 | 9/1992 | Inoue ...................................... 366/288 |
| 5,356,352 | 10/1994 | Sakamoto et al. ....................... 475/348 |
| 5,653,535 | 8/1997 | Xie et al. ................................ 366/100 |

FOREIGN PATENT DOCUMENTS

| | | | |
|---|---|---|---|
| 71206 | 7/1950 | Denmark | ................................ 366/197 |
| 4118794 | 12/1992 | Germany . | |

Primary Examiner—Charles E. Cooley
Attorney, Agent, or Firm—Thompson Hine & Flory LLP

[57] ABSTRACT

A food mixer having a planetary gear system. The mixer comprises a vertically extending stand housing an electric motor, a base to support the stand, an overhang arm connected to the stand, and a gear system housed in the overhang arm. The gear system includes a center shaft having a center gear mounted thereto, the center shaft being drivingly coupled to the motor and rotatable about its axis. The gear system further includes an agitator shaft having an agitator gear mounted on an end thereto, the agitator shaft being oriented generally parallel to the center shaft and located such that the agitator gear meshes with the center gear. The gear further includes a ring gear having a set of internal gear teeth, the ring gear encircling the center gear and the agitator gear whereby the agitator gear meshes with the ring gear. The gear additionally has a pair of agitator bearings located on the agitator shaft and a top bearing located on the center shaft, the top bearing being vertically displaced from and radially overlapping the pair of agitator bearings. The gear further comprises a needle bearing located near the bottom of the center shaft, whereby when the motor powers the center shaft the agitator shaft rotates and orbits about the center shaft, and wherein the needle bearing and the misaligned top bearing allow the center shaft and the agitator shaft to be placed in close proximity.

24 Claims, 4 Drawing Sheets

PLANETARY GEAR SYSTEM FOR MIXER

The present invention relates generally to a planetary gear system for a food mixer, and more particularly, to a compact planetary gear system for use with mixers having space restrictions.

BACKGROUND OF THE INVENTION

Commercial food mixers are frequently of a planetary-type having a stationary, mounted cylindrical bowl and a rotating beater which moves in orbital fashion within the bowl. There are generally two types of planetary gear systems used in mixers. Conventional planetary gears lack a central sun gear, and usually do not have space restriction concerns. The other type of planetary gear system utilizes a central sun-gear. Such a gear system requires less parts, has a higher speed reduction, and is more cost effective. However, the gear system utilizing a sun gear may have space restriction problems when adapted to fit in smaller mixers, such as a 10 quart mixer.

Mixers utilizing a central, sun gear typically includes a driven center shaft (sun shaft) and an agitator shaft orbiting around the center shaft. Both the center shaft and agitator shaft are housed in one or more bearing sets to guide their rotation. The bearing sets effectively increase the width of each shaft. In larger mixers, radial space is readily available, and thus bearings of various sizes may be used without concern for arrangement of the bearings. However, in smaller mixers, such as 10 quart mixers, space becomes more limited.

For smaller mixers, the distance between the agitator shaft and center shaft is restricted such that it is difficult to accommodate bearings therebetween. To resolve this problem, plain bearings have been used. However, plain bearings are not as reliable as ball or roller bearings due to the heavy load carried by the bearings, and due to the less effective lubrication provided by plain bearings. Alternatively, the problem has also been addressed by increasing the distance between the agitator shaft and the center shaft. However, this alteration necessitates several additional changes in the mixer design, including increasing the bowl diameter and modifying the bowl support, which increases the cost of such a mixer.

Accordingly, there exists a need for a planetary gear system for a mixer having a bearing arrangement wherein the agitator shaft and the central shaft may be located within close proximity of each other, and which is of relatively inexpensive and simple construction.

SUMMARY OF THE INVENTION

The present invention is a planetary gear system for a mixer wherein the central shaft and the agitator shaft are both housed within a set of bearings, and the bearings are selected and arranged such that the shafts may be located within close proximity to each other.

More particularly, the present invention provides for a planetary gear system for a mixer, the gear system comprising a center shaft having a center gear (sun gear) mounted thereto, with the center shaft being drivingly rotatable about its axis, and an agitator shaft having an agitator gear mounted thereto. The agitator shaft is oriented parallel to the center shaft and located such that the agitator gear meshes with the center gear. The gear system further includes a ring gear having a set of internal gear teeth, the ring gear encircling the center gear and the agitator gear whereby the agitator gear meshes with the ring gear. The system further includes a pair of agitator bearings located on the agitator shaft, and a top bearing located on the center shaft. The top bearing is vertically displaced from, and radially overlaps, the pair of agitator bearings. The gear system also includes a closed-end needle bearing located near the bottom of the center shaft. The present system, particularly the needle bearing and the misaligned top bearing, allows the center shaft and agitator shaft to be placed in close proximity. These and other objects and advantages of the present invention will be more fully understood and appreciated by reference to the following description, the accompanying drawings and the appended claims.

DETAILED DESCRIPTION OF THE DRAWINGS

Figure 1:
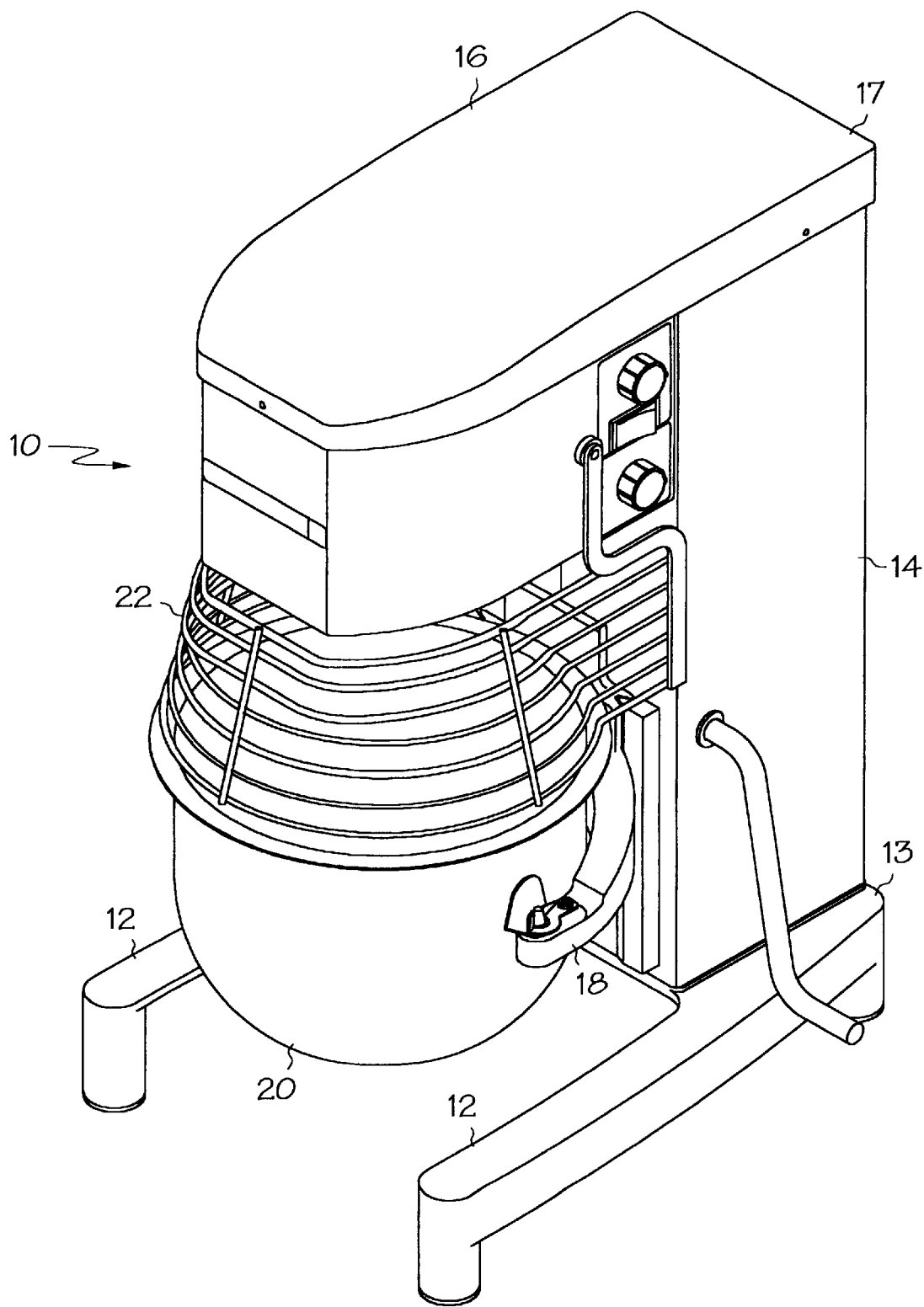
FIG. 1 is a perspective view of a mixer including the planetary gear system of the present invention.
Figure 2:
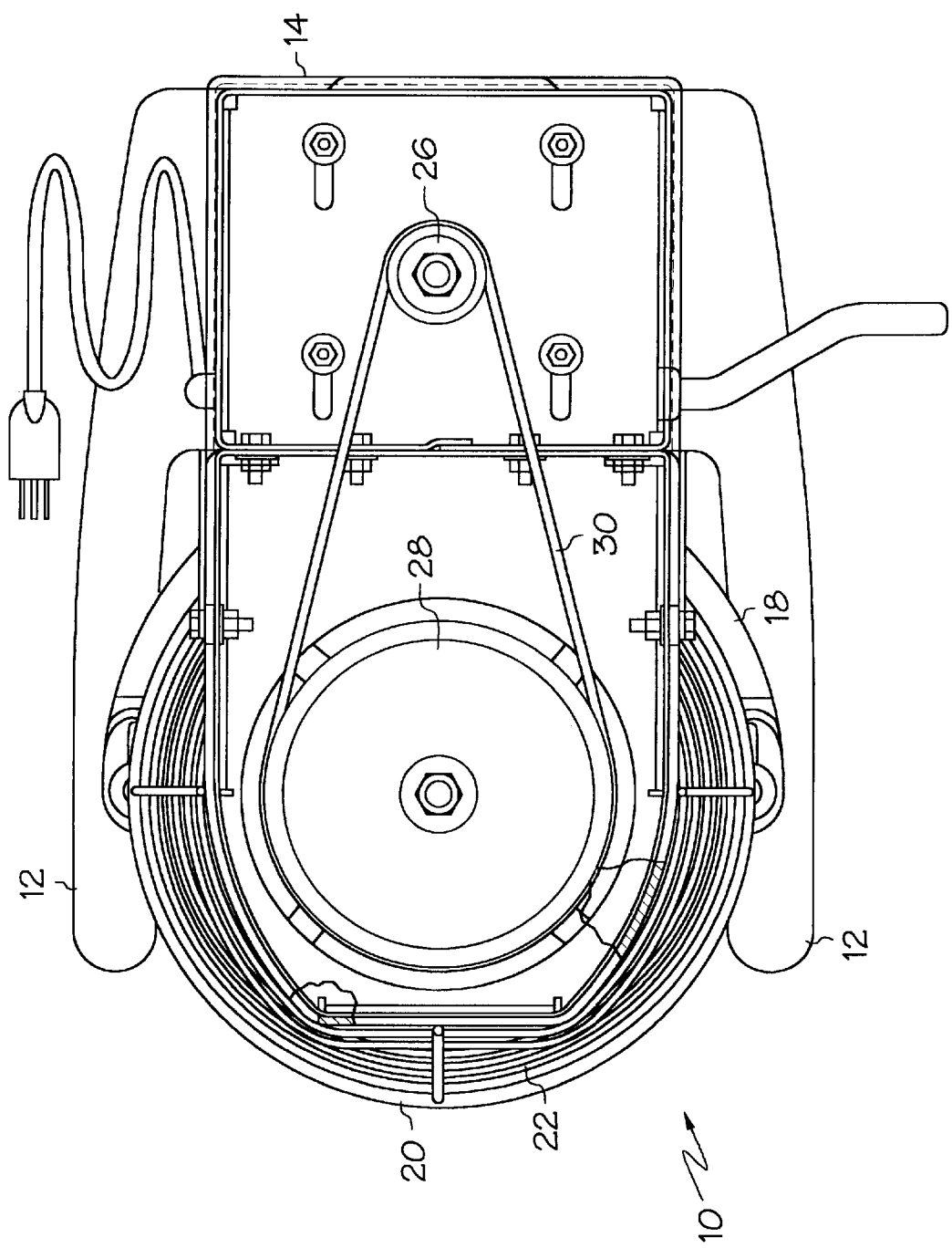
FIG. 2 is a top view of the mixer of FIG. 1 shown with the top cover removed.

A mixer, generally designated 10, incorporating the planetary gear system of the present invention is shown in FIGS. 1, 2, 3 and 4. The mixer 10 includes a pair of legs 12 and a vertically extending stand 14. Alternately, a casting base may be used in place of the legs 12. The stand 14 rests on and is secured to the legs 12 or the casting base (not shown). The legs 12 together comprise a support 13. Overhang arm 16 having a top cover 17 projects horizontally from the upper end of the support 14. Arcuate bowl support 18 is carried by the stand 14 and defines a part-circular recess which receives the upwardly-opening, stationary bowl 20. Mixer guard 22 limits access to exposed operating machine elements during mixing operations.

Figure 3:
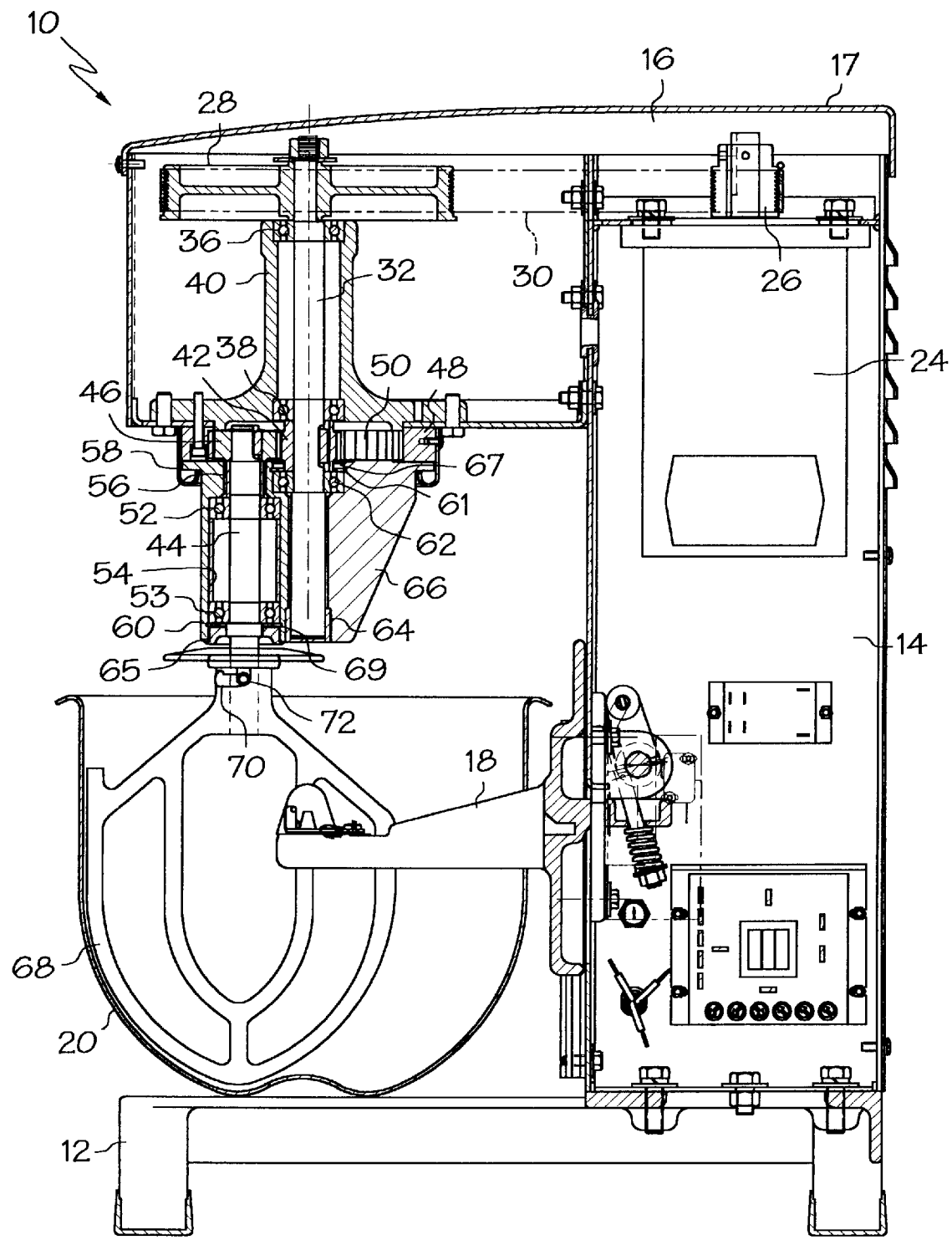
FIG. 3 is a side view in section of the mixer of FIG. 1.

As best shown in FIG. 3, the vertical stand 14 houses a generally cylindrical motor 24. The motor 24 powers output shaft 26 which is coupled to a pulley 28 by means of an endless belt 30. Pulley 28 is in turn coupled to the central shaft 32. First central bearing 36 and second central bearing 38 guide the central shaft 32 in its rotation. First central bearing 36 and second central bearing 38 are located within the overhang arm 16. Bearing housing 40 is secured to the overhang arm 16.

Center shaft 32 has a center gear 42 (also termed a sun gear) mounted between the second central bearing 38 and the upper bearing 62. Agitator shaft 44 has an agitator gear 46 located at the top of the shaft 44. Agitator shaft 44 is oriented generally parallel to the center shaft 32, and is located such that the agitator gear 46 meshes with the center gear 42. Ring gear 48 encircles the center gear 42 and the agitator gear 46. The ring gear 48 is coaxial with the center gear 38. The ring gear 48 has a set of internal gear teeth 50. The agitator gear 46 meshes with the internal gear teeth 50. First agitator bearing 52 and second agitator bearing 53 guide the rotation of the agitator shaft 44. Spacer 54 is interspersed between bearings 52, 53. Additionally, upper spacer 56 is located about the agitator shaft 44 between the first agitator bearing 52 and the agitator gear 46. Drip cup 58 provides a uniform exterior appearance, and houses the center gear 42, agitator gear 46, and ring gear 48. First retainer ring 60 is located at the bottom of the agitator shaft 44 just below the second agitator bearing 53. Retainer ring 60 retains the bearings and spacers mounted about the agitator shaft 44. Cup 65 is mounted immediately below the retainer ring 60.

Upper bearing 62 guides the rotation of the center shaft 32. A closed end needle bearing 64 is located at the bottom of center shaft 32 to further guide the rotation of shaft 32. The needle bearing 64 is preferably adjacent to the second agitator bearing 53. Second retainer ring 61 is located immediately above the upper bearing 62. Planetary 66 encompasses the needle bearing 64, the upper bearing 62, the agitator bearings 52, 53 the spacers 54, 56, and the lower ends of the shafts 32, 44. Planetary 66 has two notches 67, 69 formed in its upper center and the bottom left (as shown in FIG. 3) to receive the retainer rings 60, 61. The first notch 67 is formed in the top surface of the planetary where the center shaft intersects the planetary. The second notch 69 is formed in the bottom surface of the planetary where the agitator shaft intersects the planetary. Planetary 66 is located below the overhang arm 16.

Beater 68 is coupled to the agitator shaft 44 at the bottom of the shaft 44. Beater 68 is attachable to, and removable from, the shaft 44. The beater has a slot 70 located at its upper end to attach to the pin 72 of the shaft 44 in a standard bayonet-style coupling. The beater is rotatable about its central axis and orbital abut the center of the bowl to thereby mix the contents of the bowl.

The operation of the mixer is as follows. Motor 24 drives the output shaft 26 which in turn drives the pulley 28 by means of the belt 30. The pulley 28 drives the center shaft 32, and the center gear 42 mounted thereto. Center gear 42 meshes with the agitator gear 46, thereby causing rotation of the agitator shaft 44. The agitator gear 46 also meshes with the ring gear 48, thereby causing orbital rotation of the agitator shaft 44 about the center shaft 32. Bearings 36, 38, 62 and 64 guide the rotation of the center shaft, and agitator bearings 52, 53 guide the rotation of the agitator shaft 44. The ball bearings 36, 38, 52, 53 and 62 are preferably single row double shields (or seals) deep groove ball bearings. The needle bearing 64 is preferably a drawn type, closed end bearing. However, those skilled in the art will appreciate that other types and sizes of bearings may be used without departing from the scope of the invention.

As the agitator shaft 44 orbits about the center shaft 32, the planetary 66 also rotates about the center shaft 32. Furthermore, as the agitator shaft 44 rotates and orbits, the beater 68 also rotates and orbits, thereby mixing the contents the bowl 20.

The upper bearing 62 is vertically displaced from the agitator bearings 52, 53. In this manner, the upper bearing 62 radially overlaps the agitator bearings 52,53. The vertical misalignment allows overlapping of the bearings in the radial direction, thereby allowing the agitator shaft 44 to be placed in close proximity to the center shaft 44. The needle bearing 64 has a relatively small radial dimension, thereby also allowing the agitator shaft 44 to be placed in close proximity to the center shaft 32.

Figure 4:
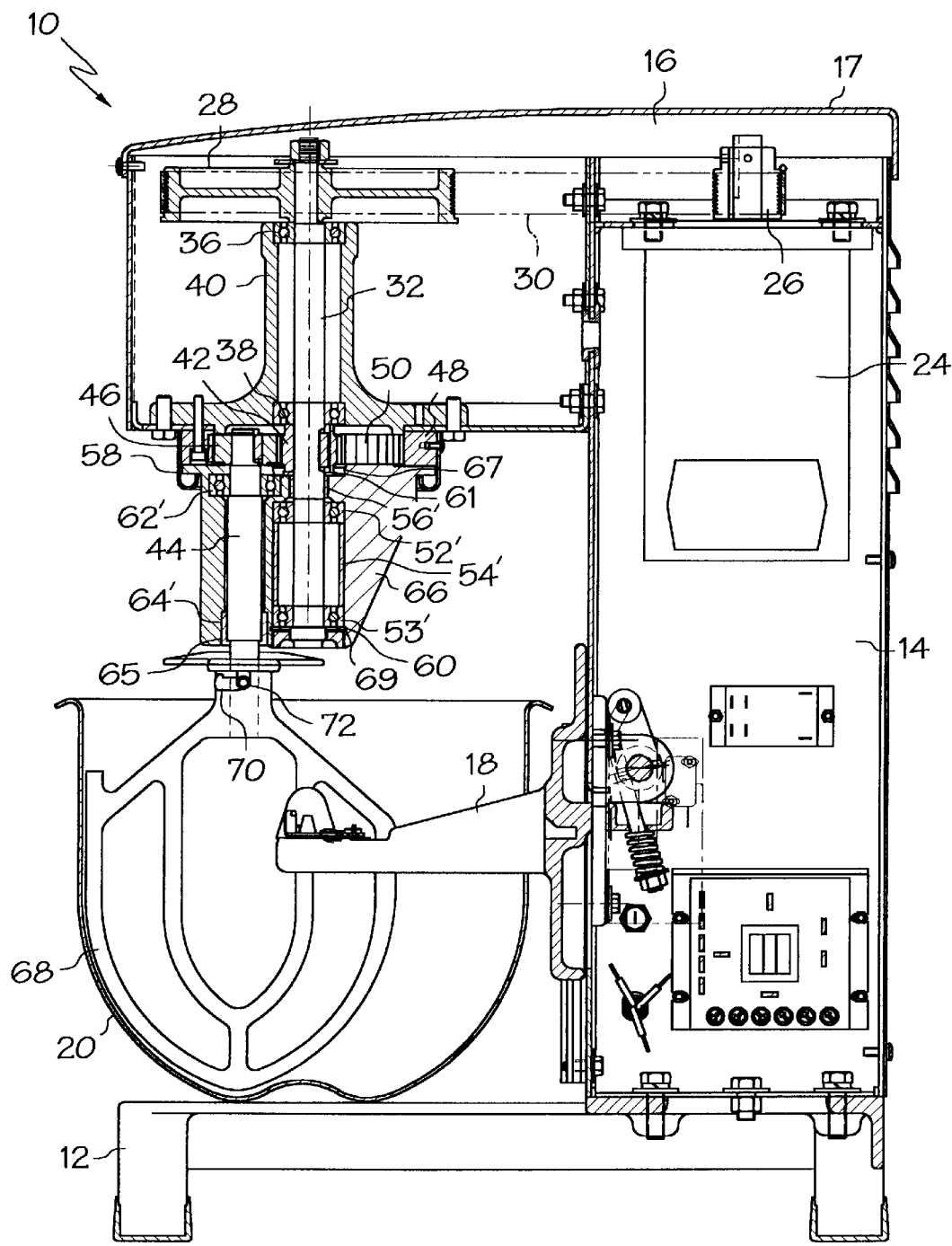
FIG. 4 is a side view in section of an alternate embodiment of the mixer of FIG. 1.

Those skilled in the art will appreciate that the mixer of the present invention may also be configured as shown in FIG. 4. In this embodiment the bearings 52', 53' may instead be placed on the center shaft, (sun shaft) 32, and upper bearing 62' and the needle bearing 64' may be placed on the agitator shaft 44. In this embodiment, however, the needle bearing should be an openend bearing, as opposed to the closed-end needle bearing used on the center shaft 32. In this embodiment, spacer 54' is interspersed between bearings 52', 53' and upper spacer 56' is located about the center shaft 32. Additionally, the bearings located on the center shaft are termed first sun shaft bearings and second sun shaft bearings. Furthermore, under the alternate arrangement a retaining ring and a plug are required on the center shaft 32 to close the opening in the planetary 66. Additionally, in order to accommodate a retainer ring, the lower notch in the planetary is formed on its lower surface where the center shaft intersects the lower surface.

While the forms of apparatus herein described constitute a preferred embodiment of the invention, it is to be understood that the present invention is not limited to these precise forms and that changes may be made therein without departing from the scope of the invention.

What is claimed is:

1. A food mixer comprising:

an electric motor;

a vertically extending stand housing said electric motor;

a base to support said stand;

an overhang arm connected to said stand; and a gear system housed in said overhang arm, said gear system including a center shaft having a center gear mounted thereto, said center shaft being drivingly coupled to said motor and rotatable about its longitudinal axis, an agitator shaft having an agitator gear mounted thereon, said agitator shaft being generally parallel to said center shaft and located such that said agitator gear meshes with said center gear, a ring gear having a set of internal gear teeth, said ring gear encircling said center gear and said agitator gear such that said agitator gear meshes with said ring gear and orbits said center gear as said center shaft is driven by said motor, a first and a second agitator bearing located on said agitator shaft, an upper bearing located on said center shaft vertically displaced from and radially overlapping said first and second agitator bearings, and a needle bearing located near the bottom of said center shaft, whereby when said motor powers said center shaft, said center shaft rotates in said upper bearing and said needle bearing and said agitator shaft rotates in said first and second bearings as said agitator shaft orbits said center shaft, and wherein said needle bearing and said vertically displaced upper bearing allow said center shaft and said agitator shagt to be placed in close proximity to each other.

2. The mixer of claim 1 further comprising a first spacer located between said first and said second agitator bearings.

3. The mixer of claim 2 further comprising a second spacer located between said first agitator bearing and said agitator gear.

4. The mixer of claim 3 further comprising a planetary located below said overhang arm, said planetary encompassing said first and second agitator bearings, said upper bearing, said needle bearing, and the bottom of said agitator shaft and said central shaft.

5. The mixer of claim 4 wherein said upper bearing is located above said first and said second agitator bearings.

6. The mixer of claim 5 wherein said planetary has a first notch formed in its top surface where said center shaft intersects said planetary, and a second notch formed in its bottom surface where said agitator shaft intersects said planetary, and wherein said mixer further comprises a retainer ring received in each of said first and said second notches.

7. The mixer of claim 6 wherein said center shaft is coaxial with said ring gear.

8. The mixer of claim 7 wherein said needle bearing is a closed end needle bearing.

9. The mixer of claim 8 wherein said needle bearing is adjacent to said second agitator bearing.

10. The mixer of claim 9 wherein said first and second agitator bearings are single row double shields deep groove ball bearings.

11. The mixer of claim 10 further comprising a drip cup housing said center gear, said agitator gear and said ring gear.

12. The mixer of claim 11 further comprising a bowl mounted below said overhang arm and a beater coupled to said agitator shaft, whereby when said agitator shaft rotates and orbits about said center shaft said beater rotates and orbits about the center of said bowl, whereby when contents to be mixed are placed in said bowl said beater mixes said contents.

13. A food mixer comprising:

an electric motor;

a vertically extending stand housing said electric motor;

a base to support said stand;

an overhang arm connected to said stand; and a gear system housed in said overhang arm, said gear system including a center shaft having a center gear mounted thereto, said center shaft being drivingly coupled to said motor and rotatable about its longitudinal axis, an agitator shaft having an agitator gear mounted thereon, said agitator shaft being generally parallel to said center shaft and located such that said agitator gear meshes with said center gear, a ring gear having a set of internal gear teeth, said ring gear encircling said center gear and said agitator gear such that said agitator gear meshes with said ring gear and orbits said center gear as said center shaft is driven by said motor, a first and a second sun shaft bearing located on said center shaft, an upper bearing located on said agitator shaft vertically displaced from and radially overlapping said first and second sun shaft bearings, and a needle bearing located near the bottom of said agitator shaft, whereby when said motor powers said center shaft, said center shaft rotates in said first and second bearings and said agitator shaft rotates in said upper bearing and said needle bearing as said agitator shaft orbits said center shaft, and wherein said needle bearing and said vertically displaced upper bearing allow said center shaft and said agitator shaft to be placed in close proximity to each other.

14. The mixer of claim 13 further comprising a first spacer located between said first and said second sun shaft bearings.

15. The mixer of claim 14 further comprising a second spacer located between said first sun shaft bearing and said center gear.

16. The mixer of claim 15 further comprising a planetary located below said overhang arm, said planetary encompassing said first and second sun shaft bearings, said upper bearing, said needle bearing, and the bottom of said agitator shaft and said central shaft.

17. The mixer of claim 16 wherein said upper bearing is located above said first and said second sun shaft bearings.

18. The mixer of claim 17 wherein said planetary has a first notch formed in its top surface where said center shaft intersects said planetary, and a second notch in its bottom surface where said center shaft intersects said planetary, and wherein said mixer further comprises a retainer ring received in each of said first and said second notches.

19. The mixer of claim 18 wherein said center shaft is coaxial with said ring gear.

20. The mixer of claim 19 wherein said needle bearing is an open end needle bearing.

21. The mixer of claim 20 wherein said needle bearing is adjacent to said second sun shaft bearing.

22. The mixer of claim 21 wherein said first and second sun shaft bearings are single row double shields deep groove ball bearings.

23. The mixer of claim 22 further comprising a drip cup housing said center gear, said agitator gear and said ring gear.

24. The mixer of claim 23 further comprising a bowl mounted below said overhang arm and a beater coupled to said agitator shaft, whereby when said agitator shaft rotates and orbits about said center shaft said beater rotates and orbits about the center of said bowl, whereby when contents to be mixed are placed in said bowl said beater mixes said contents.

* * * * *

UNITED STATES PATENT AND TRADEMARK OFFICE
CERTIFICATE OF CORRECTION

PATENT NO. : 5,934,802
DATED : August 10, 1999
INVENTOR(S) : Mark M. Xie

It is certified that error appears in the above-identified patent and that said Letters Patent is hereby corrected as shown below:

At col. 4, line 43 (claim 1), replace "agitator shagt" with --agitator shaft--.

Signed and Sealed this

Twenty-first Day of December, 1999

Attest:

Q. TODD DICKINSON

Attesting Officer

Acting Commissioner of Patents and Trademarks